(12) United States Patent
Koeppel et al.

(10) Patent No.: US 12,494,810 B2
(45) Date of Patent: Dec. 9, 2025

(54) SYSTEM AND METHOD TO REDUCE A MOBILE DEVICE USER'S RADIATION EXPOSURE AND ENHANCE BATTERY LIFE

(71) Applicant: CONTECH RF DEVICES, LLC, Jericho, NY (US)

(72) Inventors: Ronald Koeppel, Brookville, NY (US); Tomas Palacios, Belmont, MA (US)

(73) Assignee: CONTECH RF DEVICES, LLC, Jericho, NY (US)

( * ) Notice: Subject to any disclaimer, the term of this patent is extended or adjusted under 35 U.S.C. 154(b) by 622 days.

(21) Appl. No.: 17/923,099

(22) PCT Filed: May 3, 2021

(86) PCT No.: PCT/US2021/030404
§ 371 (c)(1),
(2) Date: Nov. 3, 2022

(87) PCT Pub. No.: WO2021/225928
PCT Pub. Date: Nov. 11, 2021

(65) Prior Publication Data
US 2023/0155621 A1     May 18, 2023

Related U.S. Application Data

(60) Provisional application No. 63/019,591, filed on May 4, 2020.

(51) Int. Cl.
*H04B 1/3827* (2015.01)
*G08B 21/24* (2006.01)
*H04W 52/28* (2009.01)

(52) U.S. Cl.
CPC .......... *H04B 1/3838* (2013.01); *G08B 21/24* (2013.01); *H04W 52/283* (2013.01)

(58) Field of Classification Search
CPC ...... H04B 1/3838; H04B 17/23; G08B 21/24; H04W 52/283
See application file for complete search history.

(56) References Cited

U.S. PATENT DOCUMENTS 8,270,929 B1   9/2012   Koeppel et al.
8,921,709 B2   12/2014  Koeppel et al.
(Continued)

OTHER PUBLICATIONS

International Search Report dated Aug. 12, 2021 issued in PCT/US2021/030404.
Written Opinion dated Aug. 12, 2021 issued in PCT/US2021/030404.

*Primary Examiner* — Jinsong Hu
*Assistant Examiner* — Rui M Hu
(74) *Attorney, Agent, or Firm* — Scully Scott Murphy & Presser PC

(57) ABSTRACT

The disclosure relates to a system, method and computer program product for reducing a mobile phone user's RF signal emissions exposure at the mobile device and increasing the battery life of an active mobile device. In accordance with the method, a hardware processor device obtains respective data representing: a current location of the actively communicating mobile device held by a user, a current orientation angle of the mobile device relative to a reference axis, an identification of a communications cell in which a communications receiver receiving communications from the mobile phone is located, and a location of the communications receiver. The processor computes an angle based on the data representing the current mobile device location, the current orientation angle and the location of the communications receiver, and compares the computed angle against a threshold angle. In response to the comparison, a warning is presented indicating that a user modify orientation of mobile device being held by the user.

37 Claims, 10 Drawing Sheets

(56) References Cited

U.S. PATENT DOCUMENTS

| | | | |
|---|---|---|---|
| 2005/0113125 A1* | 5/2005 | Kang | H01Q 1/245 |
| | | | 455/562.1 |
| 2009/0318135 A1* | 12/2009 | Wu | H04B 17/318 |
| | | | 455/425 |
| 2010/0113111 A1 | 5/2010 | Wong et al. | |
| 2010/0203862 A1* | 8/2010 | Friedlander | H04B 17/318 |
| | | | 455/575.5 |
| 2011/0159920 A1* | 6/2011 | Lehmann | H04M 1/03 |
| | | | 455/556.1 |
| 2013/0102332 A1* | 4/2013 | Keerthi | H04W 4/026 |
| | | | 455/456.6 |
| 2017/0150905 A1 | 6/2017 | Shen et al. | |
| 2019/0319686 A1 | 10/2019 | Chen, IV et al. | |
| 2021/0058740 A1* | 2/2021 | He | G01S 3/20 |
| 2023/0017758 A1* | 1/2023 | Shpak | G01S 3/48 |
| 2024/0242000 A1* | 7/2024 | Wodrich | G06T 17/05 |

\* cited by examiner

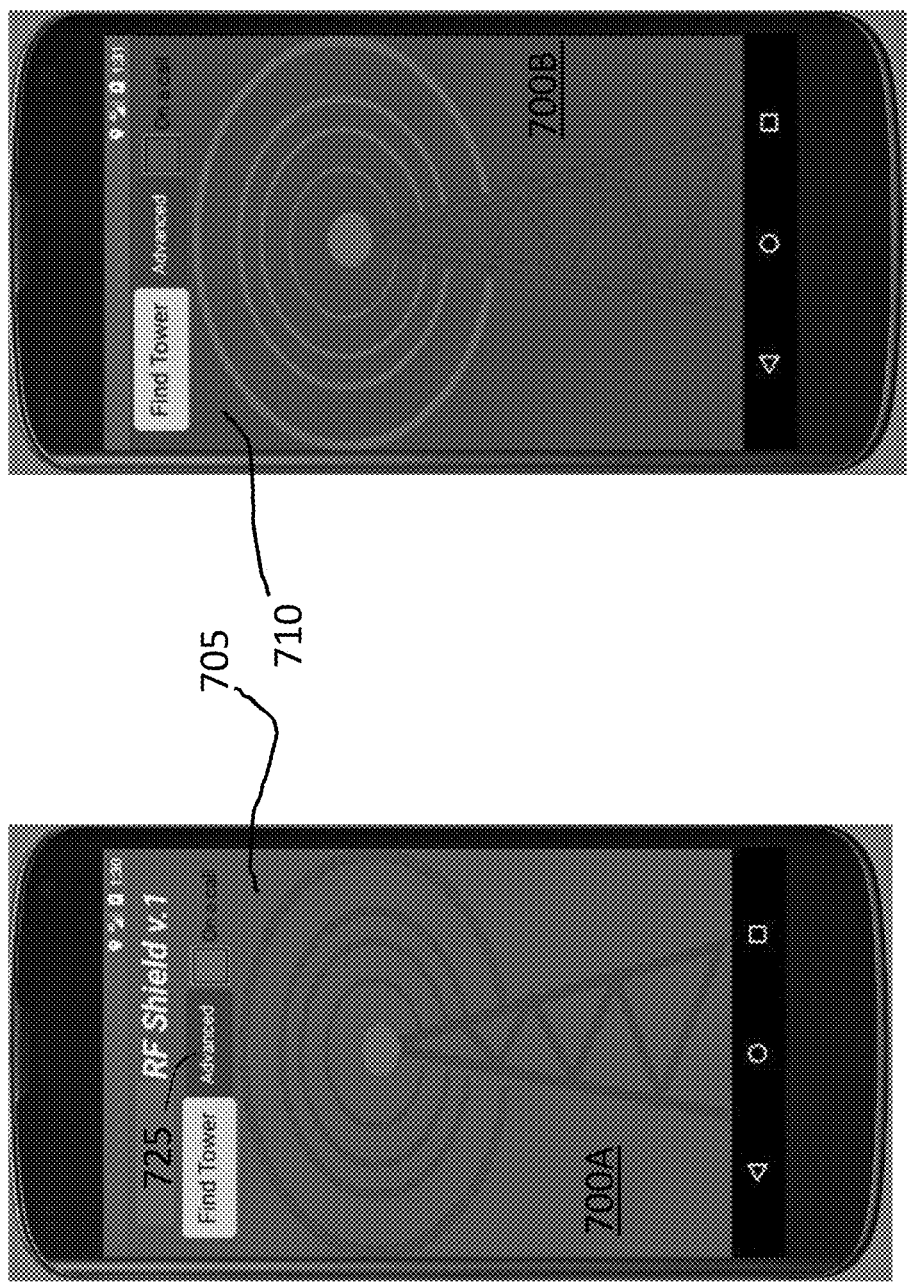

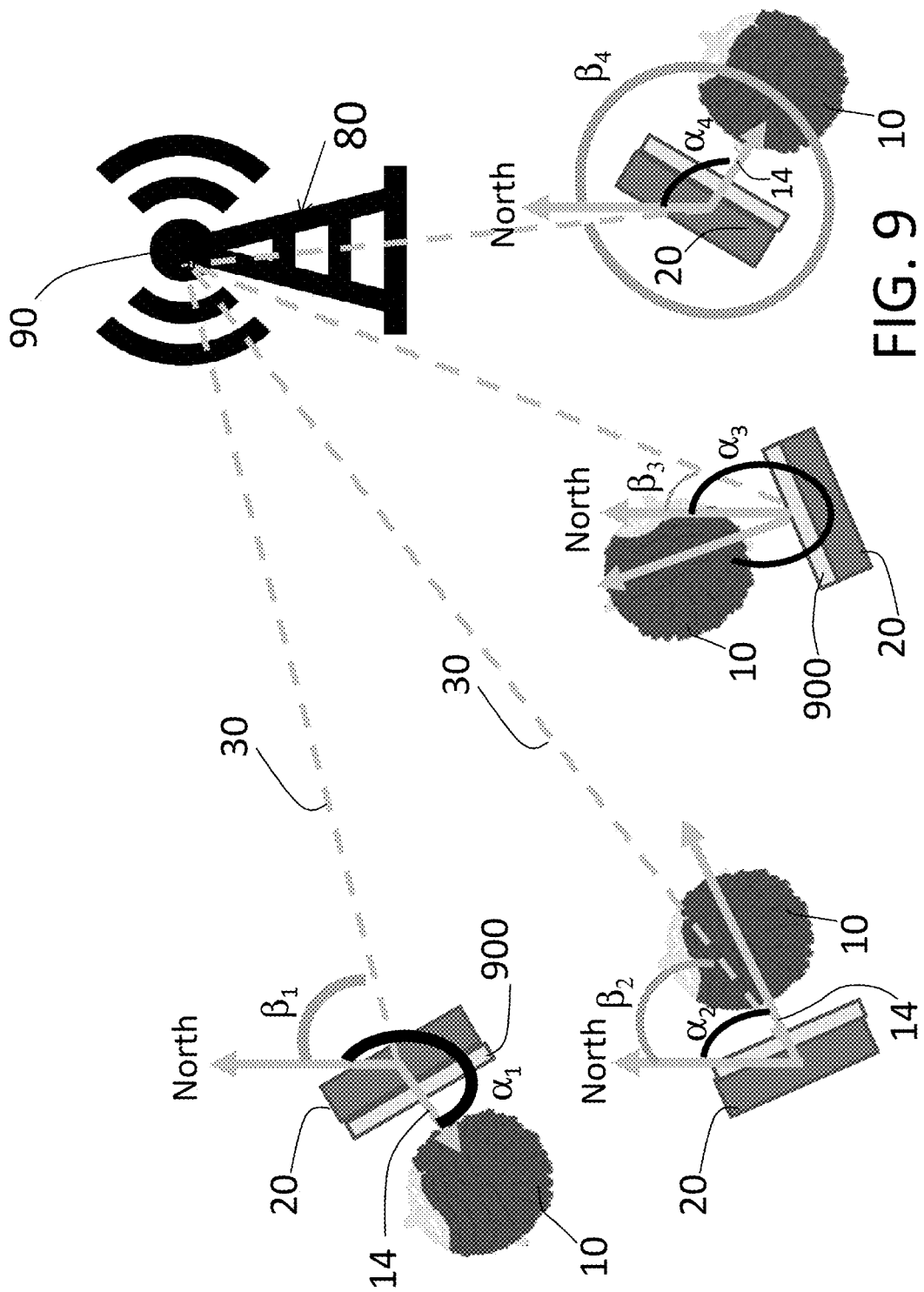

SYSTEM AND METHOD TO REDUCE A MOBILE DEVICE USER'S RADIATION EXPOSURE AND ENHANCE BATTERY LIFE

CROSS REFERENCE TO RELATED APPLICATION

The present application is a continuation of international application having Serial Number PCT/US2021/030404, filed on May 3, 2021, which claims the benefit of U.S. Provisional Patent Application No. 63/019,591 filed May 4, 2020, the entire contents of both disclosures being incorporated herein by reference.

FIELD

The present disclosure relates generally to mobile devices, such as mobile phones and mobile device communication system, such as mobile phone communication systems, and an apparatus and method for reducing the exposure of a user to radiofrequency signals when using mobile devices, enhancing battery life and improving efficiency of cell phone communications.

BACKGROUND

While current mobile phone calls offer much needed flexibility for communicating, irrespective of its location, a traditional cell phone radiates radio frequency (RF) signals/power in all directions. That is, in most cases, the cell or mobile phone is not aware of where the connecting cell phone tower receiver is relative to the antenna of the cell/mobile phone.

FIG. 1 conceptually depicts a mobile phone user 10 having a cell phone 20 transmitting signals 22 intended for receipt at a communications receiver base station 85, e.g., a radio endpoint of plural geographically distributed base stations, of a nearby cell phone tower 80. The cell phone tower and base station is part of a cellular network in which a handheld mobile phone (e.g., a cell phone) communicates with a telephone network radio frequency signals through a local antenna at the cellular base station 85 (cell site). Typically a cell tower 80 is located at the edge of one or more "cells" of a cellular network and covers multiple cells using directional antenna 90.

The transmitted cell phone signal 22 is typically omni-directional and because of this omni-directional transmission: 1) the cell phone user is constantly exposed to radiation, as for example, shown in FIG. 1, which depicts radiation 15 incident on the user's head; and 2) the head/body of the user 10 attenuates the signal when the body is between the cell phone 20 and the cell tower 80. Further, radiated energy from the cell phone is lost in all directions 25 other than the base station and only a small percentage of radiated energy 30 reaches the cell phone tower base station. As a consequence, when the body of the user is between the cell phone and the cell tower, the cell phone is forced to increase the radiated power to maintain a certain quality of service, which drains battery and increases the amount of radiation the user receives.

SUMMARY

One aspect of the present invention is a system, method and computer program product providing an ability to inform a user of a mobile device, as defined herein, such as a cell phone user of a particular place and orientation in which to position the cell phone or mobile device when actively communicating over a communications channel in order to ensure that the user's body/head is not in between the cell phone and the cell phone tower communicating with the mobile device.

Further to this aspect, an application running on the mobile device, e.g., cell phone, employs methods that makes use of information from the mobile device's global positioning system, the mobile device's list of available wi-fi and Bluetooth networks, the mobile device's internal compass, and information from a database indicating the location of a tower communicating with the mobile device to inform the user in which place to position the mobile device to ensure that the user's body/head is not in between the mobile device and the tower with which the mobile device is communicating.

In an embodiment, the user is informed of which place to position the mobile device by providing a vibration, an audible indication, a visual indication or a combination of any of these signals.

A further aspect of the present invention is an apparatus for rendering RF transmission of the mobile device more anisotropic (i.e. less omni-directional). The apparatus includes a hardware RF signal shield placed on the mobile device, such as a cell phone, to render mobile device, such as cell phone, RF transmissions more anisotropic.

In an embodiment, the combined use of the RF signal shield and the mobile device application reduces the amount of radiation directed towards the mobile device user.

In a further aspect, use of the cell phone application either with or without the RF signal shield advantageously increases the mobile device battery lifetime.

According to one embodiment, there is provided a method comprising: receiving, at a processor device of a computer system, data communicated from a mobile device held by a user, the data representing a current location of the mobile device, a current mobile device orientation angle relative to a reference axis, and data representing an identification of a communications cell in which a communications receiver is located for receiving signals communicated by the mobile device; obtaining, by the computer system processor device, data representing a location of the communications receiver; computing, by the computer system processor device, an angle based on the data representing the current location of the mobile device, the data representing current orientation angle of the mobile device and data representing the location of the communications receiver; comparing, by the computer system processor device, the computed angle against a pre-determined threshold angle; and in response to the comparison, either generating, for receipt by the user, a warning indication for the user to modify an orientation of the mobile device with respect to the user, wherein the mobile device power used to communicate signals with the communications receiver is decreased when the mobile device orientation is modified resulting in increased mobile device battery lifetime, or not generating a warning indication, wherein the user does not modify the orientation of the mobile device.

In a further aspect, there is provided a method comprising: obtaining, from a processor running at a mobile device, data representing a current location of the mobile device held by a user, the mobile device actively communicating signals with a communications receiver over a communications channel; obtaining, from the mobile device processor, data representing a current orientation angle of the mobile device relative to a reference axis; obtaining, using the mobile device processor, an identification of a communications cell in which the communications receiver is located; obtaining, using the mobile device processor, data representing a location of the communications receiver; computing, using the mobile device processor, an angle based on the data representing the current location, the data representing current orientation angle of the mobile device and data representing the location of the communications receiver; comparing, using the mobile device processor, the computed angle against a pre-determined threshold angle; and in response to the comparison, either generating, using the mobile device processor, a warning indication for receipt at a mobile device interface, a device associated with the user, or both at the mobile device interface and the device associated with the user, for the user to modify orientation of the mobile device, wherein the mobile device power usage is decreased when the mobile phone orientation is modified resulting in increased mobile device battery lifetime, or not generating a warning indication, indicating that the user not modify the orientation of the mobile device.

In a further embodiment, there is provided a system comprising: a memory storage element for storing data; a hardware processor coupled with the memory storage element, the processor configured to: obtain data representing a current location of the mobile device held by a user, the mobile device actively communicating signals with a communications receiver over a communications channel; obtain data representing a current orientation angle of the mobile device relative to a reference axis; obtain an identification of a communications cell in which the communications receiver is located; obtain data representing a location of the communications receiver; compute an angle based on the data representing the current location, the data representing current orientation angle of the mobile device and data representing the location of the communications receiver; compare the computed angle against a pre-determined threshold angle; and in response to the comparison, either generate, for receipt by the user, a warning indication for the user to modify an orientation of the mobile device with respect to the user, wherein the mobile device power used to communicate signals with the communications receiver is decreased when the mobile device orientation is modified resulting in increased mobile device battery lifetime, or not generate a warning indication for the user not to modify the orientation of the mobile device.

In a further aspect, there is provided a computer program product, including applications or mobile apps, for performing operations. The computer program products include a storage medium readable by a processing circuit and storing instructions run by the processing circuit for running a method. The method is the same as listed above.

BRIEF DESCRIPTION OF THE DRAWINGS

Objects, features, and advantages of the present disclosure will become more clear apparent when the following description is taken in conjunction with the accompanying drawings, in which:

FIG. 7A shows an example interface display on the user's mobile cell phone device having a first background color indicating that the RF shield is correctly positioned to reduce RF emissions to the user in one embodiment;

FIG. 7B shows an example of a second interface display on the user's mobile cell phone device having a second background color indicating that the RF shield is not correctly positioned to reduce RF emissions to the user.

FIG. 9 depicts various re-orientations of a mobile cell phone device held by the user of FIG. 1, including the phone device's azimuth angle, and computed bearing angle of the device's RF signals relative to the cell phone tower.

DESCRIPTION

Figure 1:
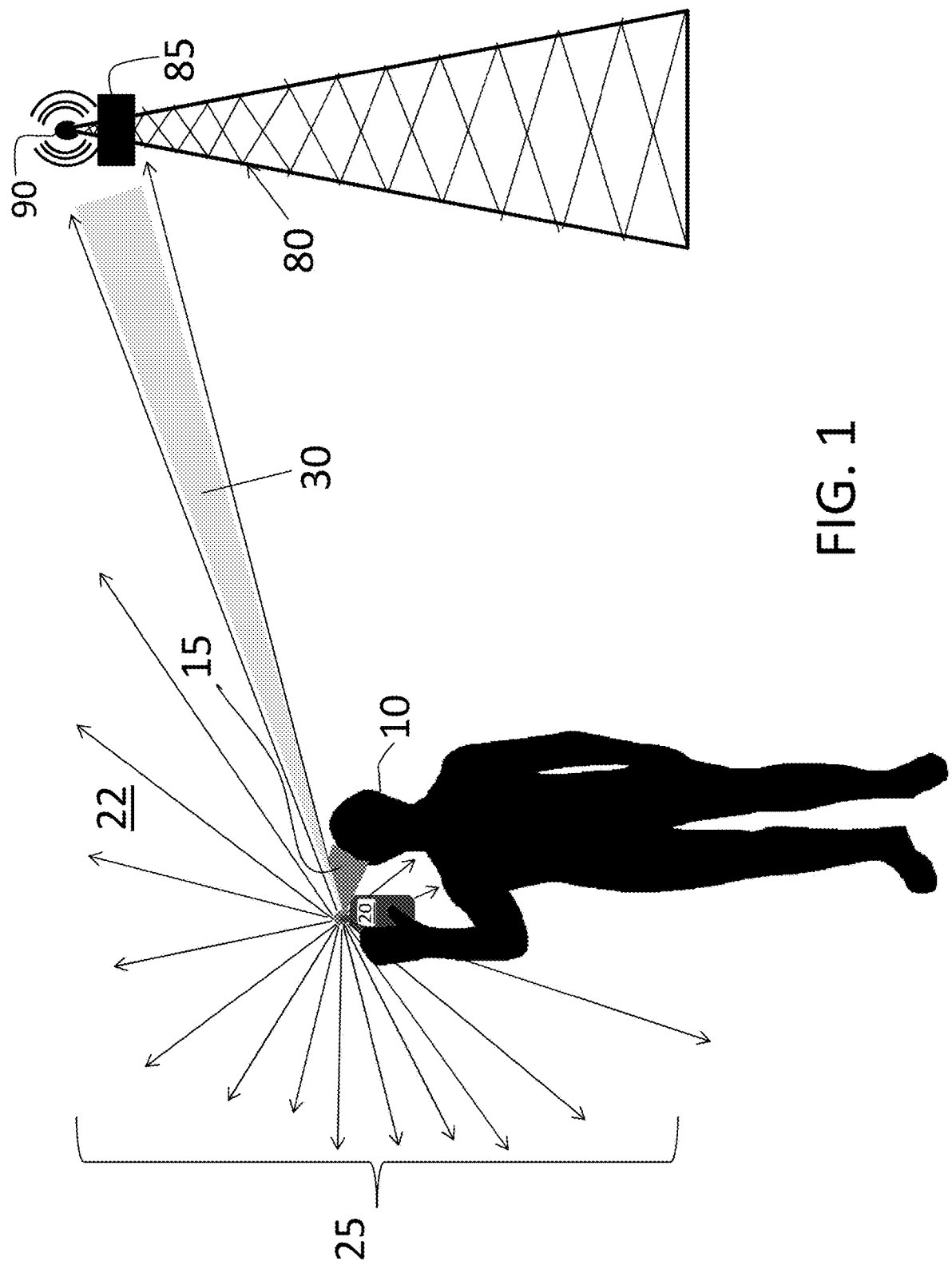
FIG. 1 conceptually depicts the radiation of signal energy from a cell phone held by a user when communicating signals with respect to a nearby cell phone tower.

The disclosure provides a system, methods and computer program products configuring an actively communicating mobile phone or other mobile device to automatically detect its orientation with respect to a user holding the phone and with respect to a location of a nearby tower which is communicating with said mobile device in order to inform the user in which place to position the mobile device in order to ensure that the user's body/head is not in between mobile device and the cell phone tower the mobile device is connected to and thereby potentially reduce the signal energy incident (RF signal emissions exposure) upon the user's body/head.

As used herein, the term "user" refers to a human in possession of a mobile device and actively communicating on the mobile device. The term "actively communicating" refers to use of the mobile device for directly communicating with a base station of a nearby cell phone tower over a communications channel for purposes such as calling, texting, e-mailing, internet browsing, gaming, etc.

The embodiments herein are directed to a mobile device e.g., a cell phone such as a Smartphone, a laptop computer, a tablet, a smart watch, an E-reader, or any portable or hand-held device having an RF transmitter that can potentially communicate with a cell phone tower, internet access point or router.

The discussion hereinbelow and the figures referenced hereinbelow may refer to a cell phone, which is an example of a mobile device. The hardware apparatus and associated software disclosed herein are applicable to any type of mobile device as defined herein. As used herein, the mobile device and associated software disclosed herein are further applicable to any type of user mobile device and further associated devices in communication with the mobile device including, but not limited to: a smart watch worn by the user, a virtual reality goggles worn by the user, or headphones or earphones worn by the user or mobile cell phone.

Moreover, the tower with which the mobile device is communicating referenced herein is, in an embodiment, a cell phone tower, even if the mobile device is not a cell phone.

To automatically detect the mobile phone's orientation relative to the user and nearby cell phone tower, an application running on the cell phone or the cloud employs methods that makes use of information from the cell phone's global positioning system, the cell phone's internal compass, the WiFi and bluetooth networks available to the cell phone, and information from public and private databases providing a cell phone tower's location.

The system, method and computer program product provides logic for obtaining information from the cell phone's global positioning system, the cell phone's internal compass, the WiFi and bluetooth networks available to the cell phone, and information from public and private databases providing the cell phone tower's location, and processing the obtained information to inform the user to re-position the cell phone (e.g., which hand to hold it) to ensure that the user's body/head is not in between the cell phone and the closest cell phone tower while the user is using the cell phone and thereby potentially reduce the user's RF signal emissions exposure.

In an embodiment, the user is informed by configuring the mobile device to provide a vibration, an audible indication, a visual indication or both an audible or visual indication provided via the cell phone user interface, and/or via another associated device such as a smart watch, a virtual reality (VR) device worn by the user such as VR goggles, an audio headphones or earbuds worn by the user, a television or any other device that the mobile device may communicate with and/or relay information to.

In most cell phones, the cell phone tower with which the cell phone communicates is the closest cell phone tower. However, with respect to next generation (i.e., 5G, 6G) cell phones employing increased directional beam patterns, the cell phone's software could instead select the cell tower which is aligned with the cell phone to reduce the radiation to the user. For instance, such next generation cell phones will receive signals and communicate with more than one cell tower; and using the software built into it, the cell phone could generate an internal signal configuring the cell phone to select to communicate with the cell tower which is in better alignment, which, may not necessarily be the closest cell tower. Further, these cell phones could generate an internal signal configuring the cell phone to reshape the transmitted RF signal radiation pattern with increased directionality to improve efficiency and/or reduce the RF signals absorbed by the user. Using the method described herein, the cell phone application could respond to the modify the radiation pattern with increased directionality to potentially reduce RF signal emission that is absorbed by the user.

As used herein, the term "potentially reduce" the user's RF signal emissions exposure refers to the fact that in response to the user re-orienting the position of the mobile device to change the position of the mobile device relative to the original position, the user's RF signal emissions exposure from the actively communicating mobile device may be reduced. If the mobile device is reoriented in a way such that the user is not in between the direct line of sight between the mobile device and the base station it is communicating with, the user's body will not attenuate the RF signal reaching the base station, which will increase the RF power that the base station receives relative to the case when the user is positioned between the mobile device and the base station. This improved reception will allow the mobile device to reduce the transmitted power while keeping the same call quality, which will improve the battery lifetime of the mobile device and reduce the RF power absorbed by the user.

In embodiments, the system method and computer program products are used in conjunction with an apparatus in the form of a hardware RF signal shield placed on the phone to render RF transmission of the cell phone more anisotropic (i.e. less omni-directional).

Figure 2:
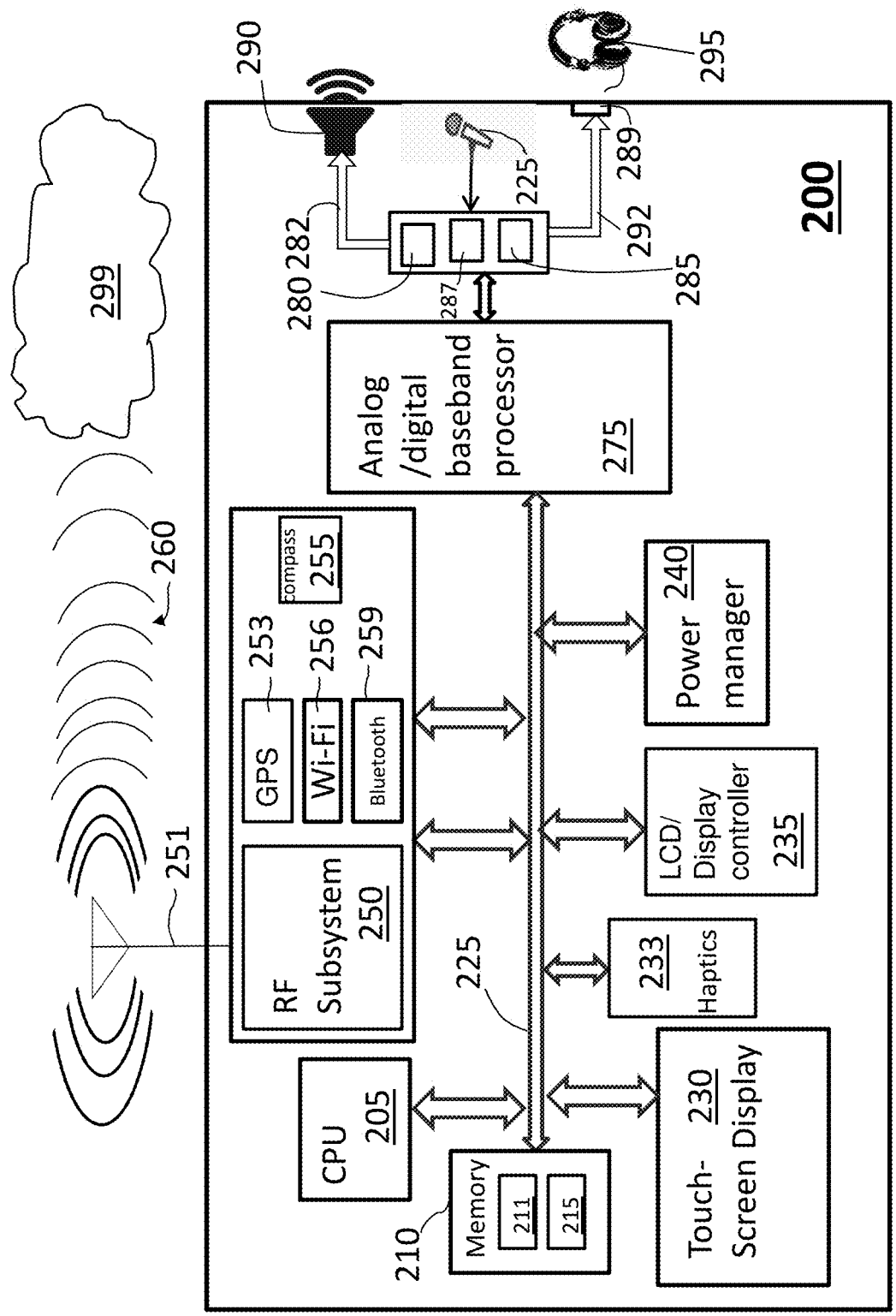
FIG. 2 depicts a block diagram of the functional operating units of a mobile phone device for carrying out methods for reducing RF signal emissions exposure in one embodiment.

FIG. 2 schematically depicts functional operating units of a mobile phone device 200 configured for carrying out methods for enhancing mobile phone's battery lifetime and reducing the user's RF emissions exposure in one embodiment. The mobile phone 200 may be a digital cellular communications device or other radio frequency communications terminal.

Mobile device 200 includes various hardware and software components for converting voice, text, multi-media messages or data calls into Radio Frequencies (RF). Mobile phone base stations transmit and receive these RF signals and connect callers to other phones and networks. Such functional hardware components include but are not limited to: a control processor unit 205 such as a microprocessor (CPU) system with associated hardware registers and memory 210 having at least operating system software 211 and application software 215 for running mobile device operations. According to embodiments, the hardware memory and registers 210 can temporarily maintain/store various cell phone data and information such as the cell phone's current latitude, longitude and orientation angle (e.g., azimuth angle "α" which is the current bearing of the screen of the mobile device relative to a true geographic reference (earth's magnetic north or south pole), as provided by certain cell-phone applications, e.g., GPS, Bluetooth, wifi, compass, etc. Azimuth is defined by Oxford Dictionary as "the direction of a celestial object from the observer, expressed as the angular distance from the north or south point of the horizon to the point at which a vertical circle passing through the object intersects the horizon". In the present embodiment, the celestial object is the cell phone antenna. By internal communication of control and data signals along an internal data and address signal bus 225, such control processor 205 may invoke/operate components such as a analog and/digital baseband processing units 275 configured for receiving and processing data handling interface operations for a display interface such as touch-screen display interface 230 or haptic interface 233 configured for both input and output operations, any keypad for a user to interface/enter user input signals, a microphone 225 as voice input mechanism, and a camera (not shown). The CPU and analog/digital baseband processing unit 275 may interface with a Radio Frequency (RF) transceiver subsystem 250 to provide analog cellular (baseband) call processing functionality and including an RF front end (not shown) operatively connected to antenna 251 for transmitting/receiving cellular phone signals for initiating and conducting mobile phone calls to other parties connected over a communications network, e.g., a cellular phone network 299, as known in the art. Further functional units provided in phone 200 may include a global positioning system (GPS) sensor (e.g., GPS receiver) 253 for providing real-time location information of the cell-phone's location. Such a GPS receiver is used in conjunction with an application that obtains and processes time coded messages from satellite positioning systems commonly used, such as GPS satellites and/or assisted GPS (AGPS) systems that make use of cellular phone feeds to the phone's GPS receiver such as course positioning information based on communications with cellular phone towers.

Further functional units provided in the phone 200 may include an internal compass 255. Such a compass includes a sensor (magnetometer) that measures strength and direction of magnetic fields to provide a simple orientation in relation to the earth's magnetic north pole. Alternatively, cell phone 200 can include any electronic compass that provides directions by connecting with the GPS receiver. A compass application running an algorithm in the cell phone device 100 can obtain and display directions no matter which orientation the cell phone is in.

Further, in one embodiment, mobile phone device is equipped with wireless communications technologies and communication protocols such as Bluetooth® 259, WIFI (e.g., 802.11a/b/g/n) 256, cellular networks (e.g., CDMA, GSM, M2M, and 3G/4G/4G LTE/5G), near-field communications systems, satellite communications, via a local area network (LAN), via a wide area network (WAN), or any other form of communication that allows mobile phone device 200 to transmit information to or receive information.

Digital processing may further include components such as a screen display interface controller 235 to provide any operating LCD and touch-screen display or haptic interface (e.g., vibration) processing functionality. Other features such as a battery power/power management system 240, any video output interfaces and/or USB interfaces are not shown. The CPU circuit 205 of FIG. 2 handles all internal processing, such as signal processing, data encoding and decoding operations, etc., as known in the art.

Although not shown, for processing input of audio signals received from a communications terminal such as another land-line or mobile phone device typically during speech communication with a remote party, device 200 further includes audio processing components, including any signal filters, gain amplifiers and/or audio speaker drivers, switch (es), any volume/mute control components, and any audio coding/decoding operations (codec) performed by an audio codec unit (not shown). In one embodiment, an audio switch 287 provides functions for providing an output audio signal path 282 to a first (built-in terminal) audio speaker 290 via a speaker drive component 280, or alternatively, a second output audio signal path 292 to a second external headset or accessory speaker 295 such as audio headphones, phone earpiece headphones, e.g., via a drive component 285 for driving an audio output or "auxiliary" audio port 289. In one embodiment, a further audio signal path (not shown) is enabled for providing an audio signal output to a hands-free blue-tooth (or like wireless connector) unit 259, e.g., providing a Bluetooth interface, for wireless communication with an external wireless speaker unit (not shown).

In embodiments, the mobile device 200 is configured in ordinary use for telephone communication purposes where a user will speak into microphone 225 (or a microphone of a headset not shown) for entering audio signals, which audio signals are processed and encoded to a cellular radio signal, e.g., RF signal) by means of the control device 205 in the mobile phone. The radio signal 252 is subsequently transmitted to a receiving base station of the cellular phone network by means of the RF transceiver subsystem 250 operatively connected to the antenna 251.

In one non-limiting embodiment, cellular phone network 299 may be part of a Global System for Mobiles (GSM) network although any public land mobile network (PLMN) may be used, e.g., $5^{th}$ Generation Networks (5G), Long Term Evolution (LTE), frequency division multiple access (FDMA), time division multiple access (TDMA) network or code division multiple access (CDMA) network. The mobile phone device 200 is configured to operate in a switched cellular communications network, as typically known, by communicating with the cellular phone base station.

As shown in FIG. 2, a cellular phone call, e.g., an active communication by the user's cell phone device 200, wirelessly communicates RF signals to the GSM network 299 over a communications channel 260. The RF signals are transmitted to and received at a mobile communications network base station system typically having an associated base station controller (not shown) that functions to route the call to a mobile service switching centre (not shown) that provides core switching functions in the network 299. As known, the users (subscribers) of the GSM network 299 are registered with the mobile service switching centre and all calls to and from a user (e.g., caller) are controlled by the mobile service switching centre. As part of the back-end GSM network (not shown), additional components are invoked for processing and forwarding a cellular phone call received over channel 260 from the user's mobile device to a receiver device which receives the call from a network endpoint base station system over another communications channel. In further embodiment, core switching functions in the network 299 can direct mobile phone device communications to/from a cloud based computer network infrastructure that provides network interconnectivity between a cloud based or cloud enabled application, services and solutions.

In accordance with the invention, under control of the particular mobile device operating system software 211, Android OS (Google Inc.), iPhone OS/iOS (Apple), MeeGo OS (Nokia and Intel), BlackBerry OS (Research In Motion), Bada (Samsung Electronics), Windows OS (Microsoft), HarmonyOS (Huawei), etc. programmed instructions such as provided in a application software 215, e.g., downloaded to and stored in the memory 210, are run to configure the mobile cell phone device to instruct the user to reduce the amount of RF signal radiation directed towards the cell phone's user holding the phone and/or decrease the amount of power consumption to thereby increase the mobile phone's battery lifetime.

In embodiments, the functionality of the application described herein can be provided as a cloud based service in a manner transparent to the user. For example, as a cloud-based service, the application and methods thereof can be run on a remote server computing device and initiate wireless communications to carry out the methods to inform the user to modify the user's cell phone orientation in order to reduce RF signal exposure and/or to reduce cell phone battery consumption and increase battery lifetime.

In conjunction with the running of the application software 215 either at the mobile phone or at a remote cloud-based server device, an apparatus in the form of an RF shield is located between the cell phone antenna and the cell phone user to attenuate the amount of radiation directed towards the user. An embodiment of an RF shield that can be deployed includes the RF shield described in U.S. Pat. No. 8,921,709, the whole contents and disclosure of which is incorporated by reference as if fully set forth herein.

The RF shield is applied to a mobile phone device and makes the RF transmission of the cell phone more anisotropic (i.e. less omni-directional), as it reflects the radiation directed towards the user. At the same time, as the shield reflects RF signals, it increases the power transmitted in the direction opposite to the shield, which improves reception and further improves the cell phone's battery life.

In operation, the cell phone application software 215 identifies whether the RF shield is in between the cell phone antenna and the cell phone tower that the cell phone is transmitting to.

The software part of the solution (the RF signal exposure reduction application or "app") uses data from the GPS, the cell phone's internal compass and access to (public and/or private) databases of cell phone towers' location to tell the user in which place to position the cell phone to ensure that the user's body/head is not in between the cell phone and the closest cell phone tower or, in the next generation cell phones, the cell tower with which the cell phone is in better alignment. Besides use of satellite positioning systems commonly used, such as GPS, Wi-Fi signals, Bluetooth signals or triangulation from several cell phone towers can also be used to calculate the cell phone tower's location. Use of GPS can include use of GLONASS, Galileo and BeiDou global navigation satellite-based systems.

By employing the combination of the RF shield and the application, the amount of RF radiation directed towards the cell-phone user is further reduced. In addition, as the invention helps to position the transmitting device in direct line-of-sight with the receiving base station (i.e. the user's body is not in between), the reception quality improves which could increase the cell phone battery lifetime.

Figure 3:
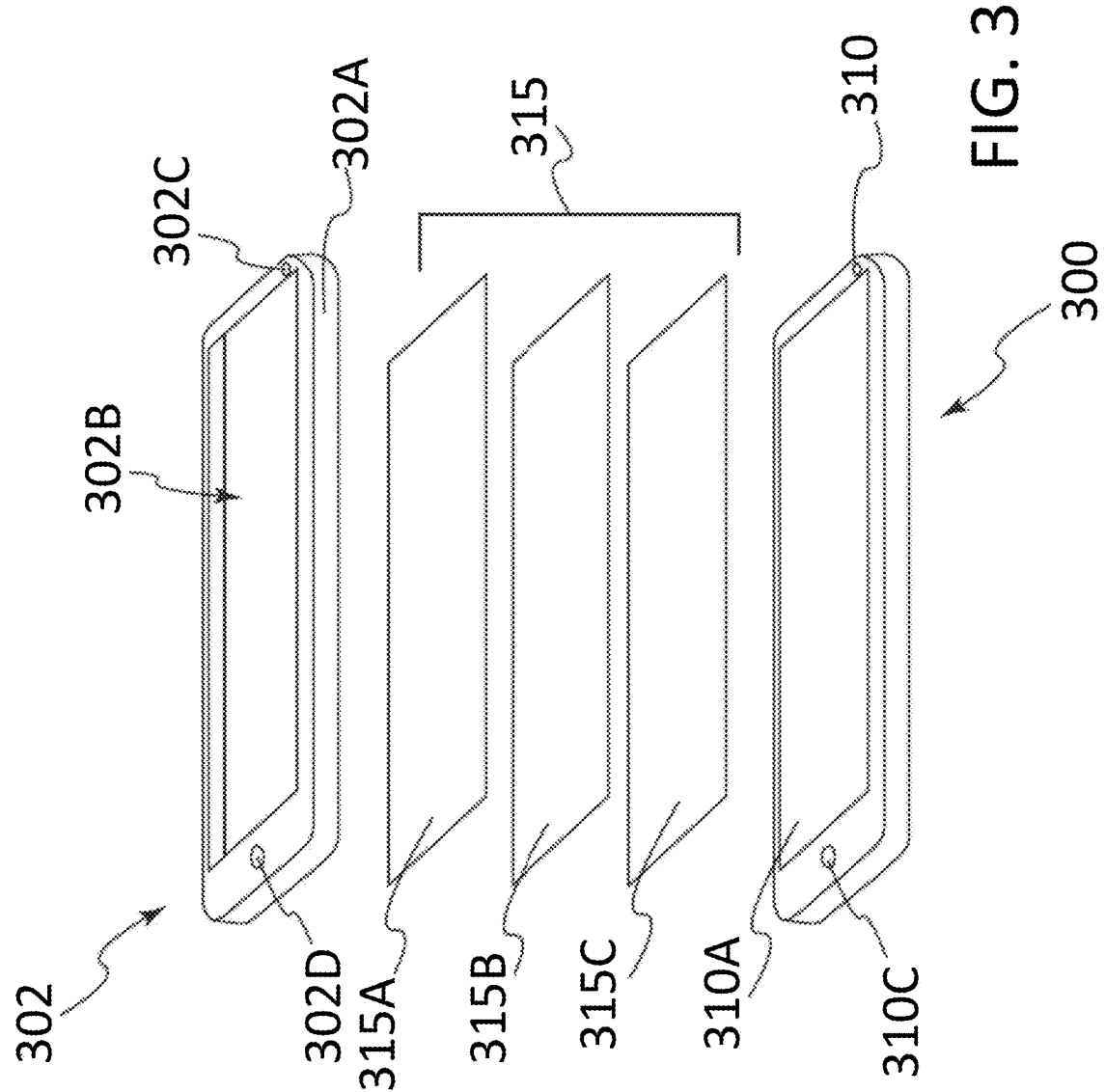
FIG. 3 depicts an exploded view of an RF shield apparatus for placement on a mobile cell phone device for reducing radiation received at a user's body and increasing the cell phone's RF emissions efficiency.

Referring to FIG. 3, an embodiment of an RF shield is shown in an exploded view. The RF shielding device is constructed of a frame member 302 configured and dimensioned to envelop at least a top surface of a mobile device 300. The frame member 302 is particularly sized for a corresponding model of mobile device, thus one frame member 302 may be specific is an iPhone® device while a second frame member 302, having different dimensions, may be specific to a Google Nexus Smartphone device, or a Samsung Galaxy device.

The frame member 302 may be formed of a plastic, silicone, thermoplastic polyurethane, rubber or metal frame 302A. The frame member 302 has a display void 302B centrally formed thereon. The display void 302B is aligned with an area corresponding to a display 310A of the corresponding mobile device 300. Thus, the frame 302A encircles a perimeter of the mobile device 300 such that the entirety of the display 310A is aligned with and visible though the display void 302B.

Since many mobile devices 300, such as cell phones, are equipped with forward facing cameras 310B and hardware buttons 310C on a top surface of the mobile device 300, the corresponding frame member 302 is configured with camera void 302C and button void 302D corresponding to the forward facing camera 310B and hardware button(s) 310C, respectively. Alternatively, the button void 302D corresponding with the hardware button(s) 310C may be formed of a flexible material, such as rubber or an appropriate plastic that allows for user actuation of the underlying hardware button(s) 310C. Moreover, cutouts may be provided for any other components disposed on the front face of the mobile device, for example speaker openings, microphone openings, ambient light sensors, and the like.

A RF shielding screen 315 is fitted against an inside surface of the frame member 302 such that the RF shielding screen 315 is aligned with the display void 302B. Thus the RF shielding screen 315 is disposed between the frame member 302 and the mobile device 300. The RF shielding screen 315 is constructed of a first clear film layer 315A that is electrically insulating, an electrically conductive grid layer 315B, and a second clear film layer 315C that is electrically insulating as well. The first clear film layer 315A and the second clear film 315C may be formed of any transparent material, such as plastic or glass.

In an embodiment, the second clear film layer 315C functions as a substrate on which the grid layer 315B is formed by way of electronic printing, chemical vapor deposition, physical vapor deposition, and the like. In the case of printing, inks containing carbon nanotubes, copper, or other conductive materials can be used. Alternatively, the grid layer 315B may be a separately fabricated layer sandwiched between and bonded to the first plastic film layer 315A and the second plastic film layer 315C. In an embodiment, the conductive grid layer can be connected to an electrical ground of the cell phone. Further the conductive grid layer can be embedded in the display of the cell phone and/or fabricated of thin film transistors (TFT) technology.

In an embodiment, the grid layer 315B is formed independent of the first clear film layer 315A and second clear film layer 315C. The wires of the grid layer 315B may be formed of individual wires woven together. It should be noted that the RF shield 300 does not require the first clear film layer 315A and the second clear film layer 315C for proper operation. Rather, the grid layer 315B can be placed directly on to the mobile device 300. However, the first clear film layer 315A and second clear film layer 315C are provided for protection of both the surface of the display screen 310A from scratching by the grid layer 315B and protection of the wire traces of the grid layer 315B from damage due to contact with a user's fingers or other foreign objects.

Figure 4:
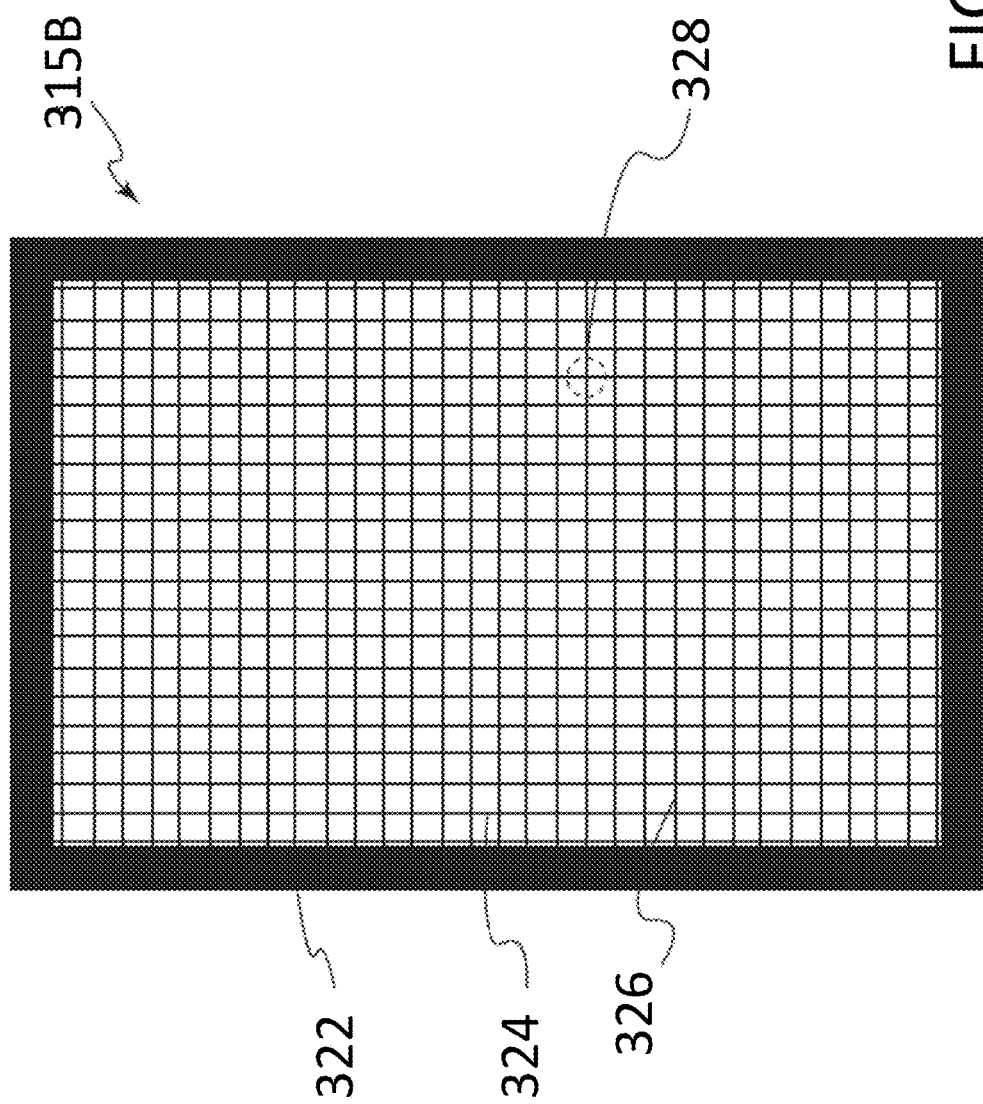
FIG. 4 depicts a conductive grid element of the RF shield apparatus of FIG. 3 according to an embodiment.

FIG. 4 shows a detailed representation of the structure of the grid layer 315B. The grid layer 315B has a conductive trace 322 formed around the perimeter of the grid layer 315B. Additionally, vertical wire traces 324 are provided between two parallel sides of the conductive trace 322. The two parallel sides are oriented perpendicular to the direction of the vertical wire traces 324. Also, horizontal wire traces 326 are provided between the two other parallel sides of the conductive trace 322. The two other parallel sides are oriented perpendicular to the direction of the horizontal wire traces 326.

Moreover, at intersection points 328, the vertical wire traces 324 and the horizontal wire traces 326 are in electrical contact with each other. Both ends of each of the vertical wire traces 324 and the horizontal wire traces 326 are also in electrical contact with the conductive trace 322. In this way, the grid layer 315B forms a plane of equipotential charge that negates the charge of the impinging RF field. The mesh spacing should be fine enough to block a significant portion of the RF signal, but coarse enough not to disable the touch screen functionality.

In an embodiment, the RF shielding screen 315 is dimensioned to be larger than the display 310A, however, it can also be dimensioned smaller than the cell phone display area in a manner such that the RF shielding screen 315 is located sufficiently between the cell phone antenna and the cell phone user to attenuate the amount of radiation directed towards the user of the mobile device.

In an embodiment, the RF shielding screen 315 is dimensioned to cover the entirety of the front face of the mobile device 300 or less than the entirety of the front face. The conductive trace 322 is dimensioned with a width as large as possible without impinging the display 310A. In an embodiment of the present invention, the conductive trace 322 is arranged to correspond with an outside perimeter edge of the display 310A and extends to the outside perimeter edge of the RF shielding screen 315.

There are two electromagnetic affects working in the shield. All the conductive portions of the shield are electrically connected forming a plane of common potential. The configuration of the pattern of the RF shielding screen 315 exploits the aperture phenomenon where RF waves react to a conductive mesh in a similar manner as a conductive sheet. If the spacing between the mesh elements is significantly smaller than the wavelength of the RF signal and the mesh elements are electrically connected, the mesh will reduce the transmission of, or block, the signal from the backside of the shield.

The second affect is the presence of the conductive material in close proximity of the phone's antenna. The conductive material presents a path of lower impedance, compared to air, for the RF and attracts the signal and redirects it.

The mesh spacing (or pitch) should be fine enough to block a portion of the RF signal, but coarse enough not to disable the touch screen functionality. In a non-limiting embodiment, to block at least 70% of RF, a mesh having a pitch of no greater than 5 mm is desirable. However, in an earlier version of the iPhone® (e.g., iPhone® 4/4s), for example, the pitch cannot be less than 2 mm, otherwise the touch screen functionality will be degraded. Therefore, for an iPhone® 4/4s Smartphone, an appropriate shielding screen 315 has a pitch ranging between 2 mm and 5 mm. The optimum distance/pitch of the mesh pitch is configurable and can be optimized base on the dimensions of the particular cell phone device and operating RF frequency of the communication channel.

In another embodiment (not shown), the horizontal conductive trace and vertical conductive trace forming the conductive trace 322 of the RF shielding screen 315 have different widths. Moreover, the above-described embodiments provide that the RF shielding screen 315 has a grid pattern formed by intersecting wire traces at 90° with one another. However, alternative grid patterns may be effectively used as well. For example, a diamond grid pattern may be employed in which the wire traces intersect at angles less than 90°. Alternatively, the grid pattern shown in FIG. 4 can be rotated at any angle between 3° and 80°, thus forming a square-like pattern with intersections at 90° there between. As a further alternative, the grid is patterned as first wire traces formed as concentric circles with radially extending intersecting lines formed of second wire traces. As an alternative to using the grid, a pattern of parallel wire trace lines can be used.

Figure 5:
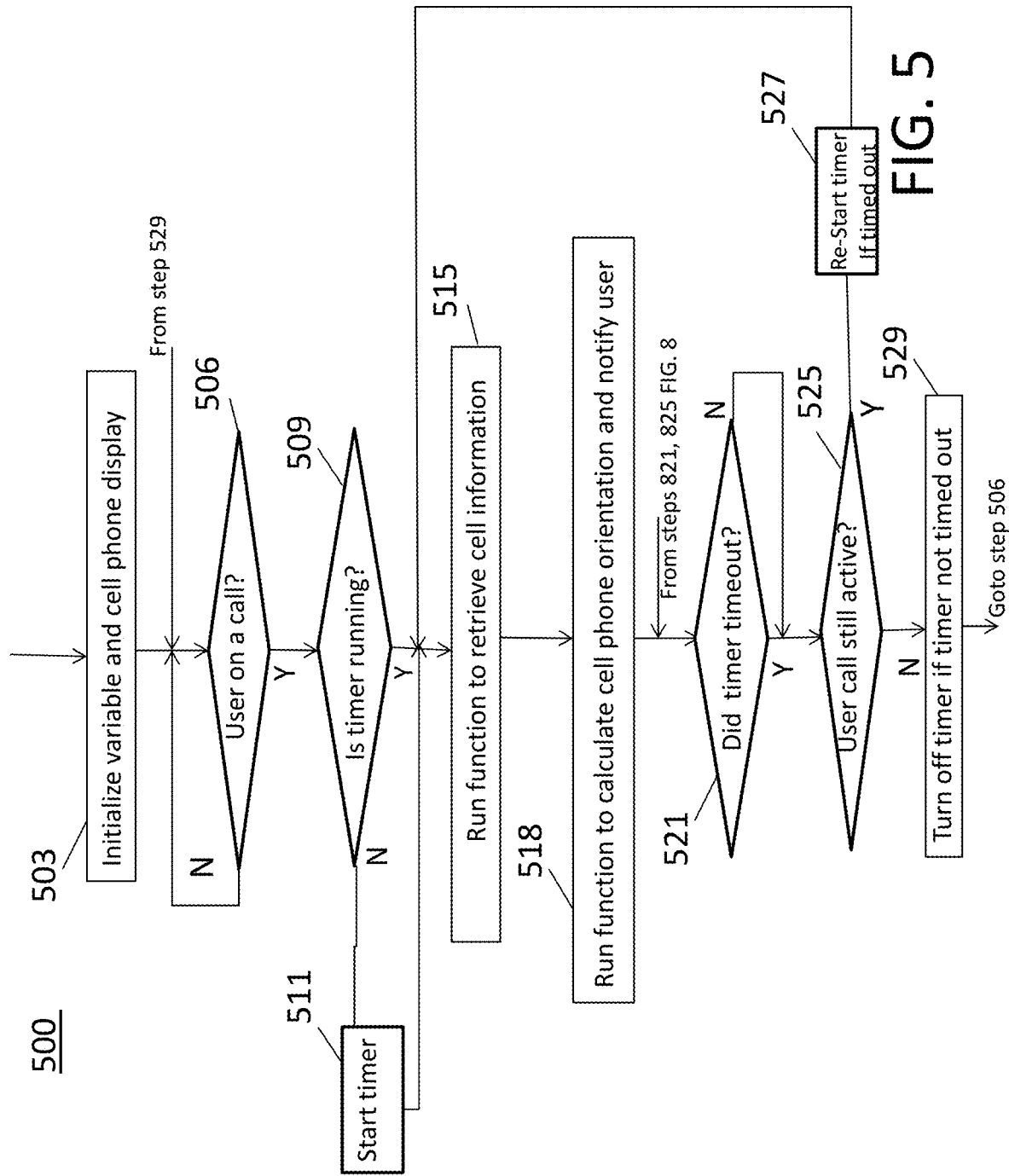
FIG. 5 depicts a method embodied in an application run at the user's mobile cell phone for operating the mobile cell phone for reducing RF emissions to the user in accordance with one embodiment.

FIG. 5 depicts a method 500 embodied in an application run at the user's mobile/cell phone or run as a cloud-based service for operating the mobile/cell phone for reducing RF signal emissions exposure to the user in accordance with one embodiment. In embodiments, the method can run to reduce a user's emissions exposure whether the RF shield is placed thereon or not. In particular, the application running on the mobile phone or cloud based server implements methods that use GPS or other satellite data, compass data, amount of transmitted and received power, databases of cell phone towers' location and/or data received from the cell phone tower to determine the cell phone location and orientation relative to the antenna it is communicating with. Using this information, the application running in the cell phone identifies whether the RF shield is in between the cell phone antenna and the cell phone tower that the cell phone is transmitting to and further notifies the user whether the RF shield is between the antenna and the cell phone tower or not and notifies the user by changing the display, vibrating and/or producing an audio or visual warning signal. In embodiments when the RF shield is not in use, the battery life of the phone is increased by changing the user's cell phone orientation in response to the received notification.

As depicted at 503, a first step performed by the reduce RF emissions application is to initialize variables and the cell phone display interface. The variables to be initialized include variables storing the user cell phone's position, such as a current latitude, longitude, the cell phone's orientation, e.g., an azimuth angle "α" which is the current compass bearing relative to a true geographic reference (e.g., earth's magnetic north or south pole). Further variables initialized for storage in device memory include variables representing a nearest cell phone network operator, a uniform resource location (URL) of a public or private database providing an identification and location of the cell phone tower the cell phone is communicating with, including an identification of the particular cell in which the nearest base station or cell phone tower located. A further variable may include a timer value which represents a pre-determined amount of time (e.g., 30 seconds) within which the method for determining a cell phone's position relative to the cell phone tower for warning the user is determinable. A further variable stores a threshold angle used for comparison against a computed angle representing the orientation of the mobile phone device relative to the cell phone tower.

Then, at 506, a determination is made as to whether the user is using the cell phone in the first instance, i.e., if the cell phone is turned on and if the user is actively engaged in a communication using the cell phone. If the user is not on the cell phone, the application idles until it is detected that the cell phone is in use by the user.

Figure 6:
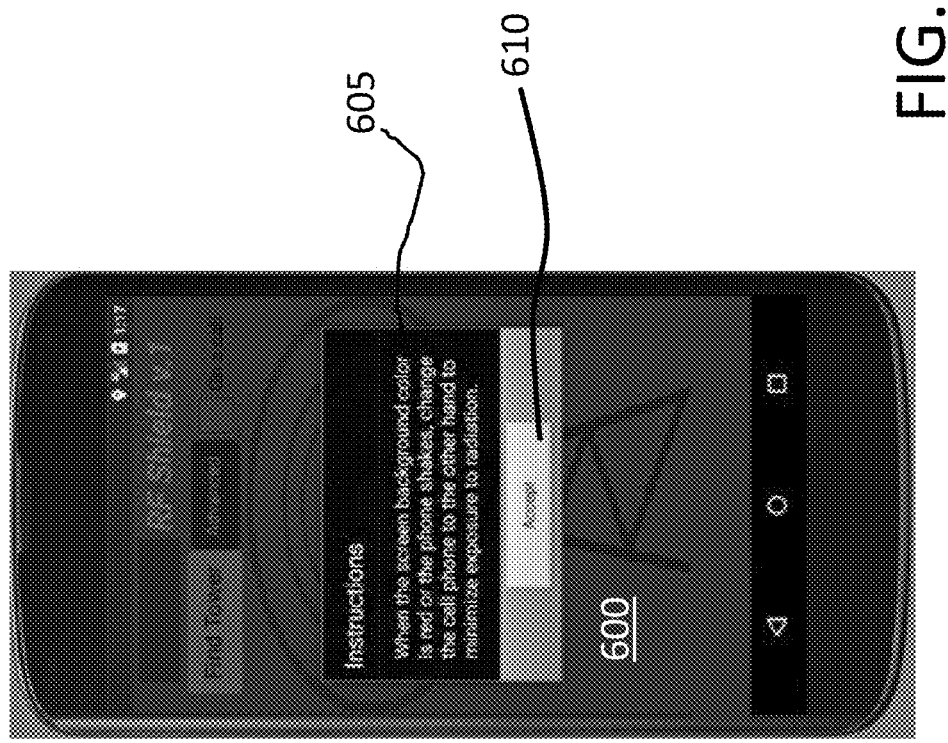
FIG. 6 depicts an interface displayed on the user's mobile cell phone device for instructing the mobile cell phone user to handle or manipulate the cell phone in accordance with one embodiment.

As shown in FIG. 6, at such time the cell phone is detected in use, the application runs software instructions to present the user via the mobile phone (touch-screen) display interface 600 of an instruction 605 for informing the user of the particular prompt(s) or interfaces that the user should be aware of in order to enable the user to reduce/minimize any RF emissions that the user may be subjected to given a current orientation of the phone relative to the user and relative to the nearest cell phone base station receiving communications therewith. For example such a displayed instruction 605 informs the user that when the screen interface background color changes to a certain color (e.g., red) and/or if the phone vibrates or makes a certain audible sound, then the user must change the mobile phone's orientation or the user's orientation in order to minimize the user's RF signal emissions exposure. For example, the warning will instruct the user to change the user's hand holding the phone (i.e., transfer the phone to the user's other hand) while the user remains in the same position in order to minimize the user's RF emissions exposure. Alternatively, the user may change his orientation, e.g., turn an angle up to 180° degrees while keeping the phone in the same hand, or move the cell phone to a different position relative to the user's original position in order to minimize the user's RF emissions exposure. In an embodiment, responsive to a cell phone user changing the cell phone (or similar device) to the other hand, and with the RF shield placed therein, the phone emissions are rendered more unidirectional and any radiation received by the user is reduced. In an embodiment, it may be reduced as much as 50%. Nevertheless, in accordance with the present invention, the emissions are effectively reduced. The prompting via the display or haptics will apply to any cell phone device whether the RF shield is placed thereon or whether the device is without the shield. In an embodiment, further caused for the display interface 600 is a button or similar widget 610 that the user must select via the touch-screen interface in order confirm user acknowledgement of the displayed instruction 605 and to ensure activation of the RF emissions reducing application.

Returning to FIG. 5, upon user selection of the button 610, or at such time the cell phone is detected in use, at 509, a determination is made as to whether an internal timer is running. If the internal timer is detected as not running, the process proceeds to 511 to initiate the start of an internal timer function. This timer is an internal timer that could be set by a user and could be an implementation of a device clock application software routine enabling users to set an alarm or set a timer or other time-keeping operations by interfacing with an internal device clock source. In an embodiment, the timer is initialized and configured to count down from the predetermined timer value (e.g., 0.5 minutes or greater). If the timer has been set and initialized, the process proceeds to 515 in order to run function to retrieve cell information used to determine the orientation of the cell phone relative to the nearest cell phone tower receiving the RF phone emissions. At 518, the RF signal emissions reduction application invokes a function that receives the retrieved cell phone information, calculates the cell phone orientation, and based on this information, configures the cell phone to initiates the prompting at the cell phone to notify the user to change the orientation of the cell phone, e.g., change the ear being used to listen or change the user's hand being used to hold the cell phone, or change the user's orientation (e.g., change the user's orientation up to 180° degrees) or change the cell phone's position relative to the original position. As the application continuously runs the method as long as an active phone call is in progress, the user will be promptly notified as to whether the phone's orientation has been sufficiently changed to reduce the user's RF signal emissions exposure, for example, via the phone's screen interface, the next time the process repeats.

In an example embodiment, as shown in FIG. 7A, with or without the RF shield placed on the user's mobile device, based on a result of the calculations made at 518, the application software will set the mobile phone display background 700A in a first color 705, e.g., green, meaning that the device is in an orientation in which user RF emissions exposure is reduced. Alternatively, as shown in FIG. 7B, based on a result of the calculations made at 518, the application software will set the mobile phone display background 700A in a second color 710, e.g., red, meaning that the mobile phone device is in an orientation relative to the nearest cell phone tower that potentially exposes the user to enhanced RF emissions, and thus prompting the user to change the cell phone orientation such as by switching hands holding the device to reduce RF signal emissions exposure.

Figure 7C:
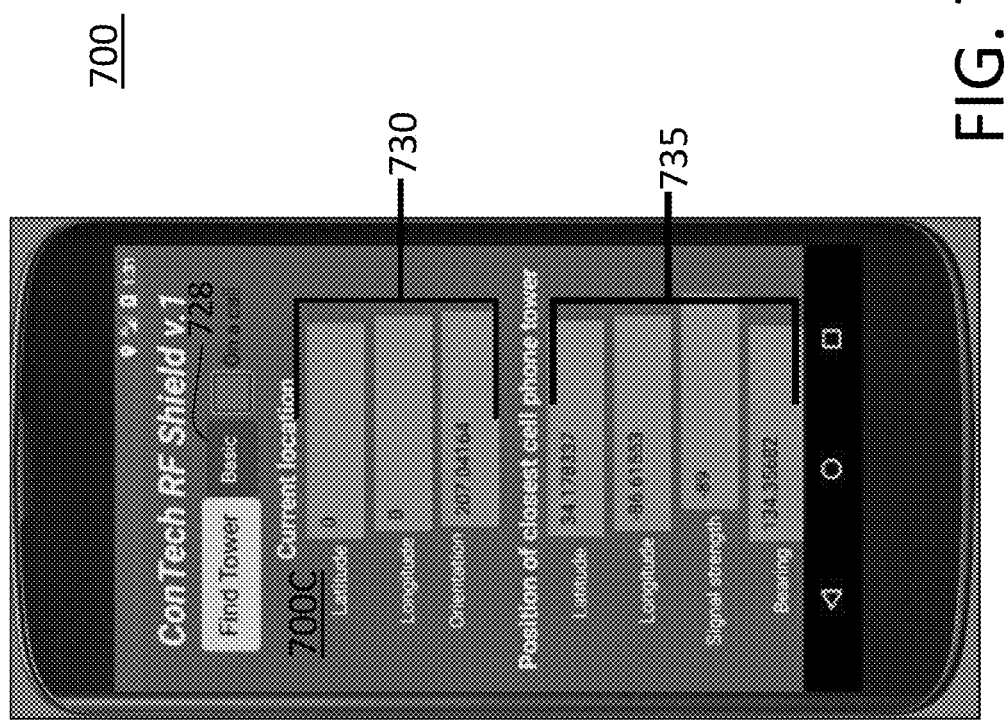
FIG. 7C shows an example interface display on the user's mobile cell phone device responsive to an advanced setting in which the current device location and cell phone tower location information are displayed for the cell phone user.

In an embodiment, as shown in FIG. 7C, the application for reducing RF emissions exposure can run in an "advanced" mode which is an operating mode that presents to the user, via interface display 700C, detailed information concerning the current user cell phone and nearest cell phone tower locations. Such advanced mode will generate for presentation to the user phone interface the stored cell phone data and cell phone tower/base station information obtained and stored as variables within the program stored in mobile phone device memory: data 730 indicating the current user cell phone location including the user's cell phone latitude, longitude and orientation (azimuth angle α) values; and data 735 indicating the current nearest cell phone tower location including the cell phone tower location latitude, longitude, the current RF signal emissions strength, and a computed hearing angle "β" representing the angle between a north-south line of earth or meridian and a line connecting the nearest cell phone tower and the user cell phone reference location. Alternatively, the mobile-phone application and/or cloud-based service running, in a manner transparent to the user, the application for reducing RF emissions exposure can run in a "basic" mode which presents little or no detailed information concerning the user cell phone and nearest cell phone tower locations via the phone interface. In an embodiment, as shown in FIG. 7A, the presentation display mode (advanced or basic) is user selectable, with a user-selectable "advanced" button 725 shown which, upon selection, can result in a rendering of the "advanced" mode screen display 700C shown in FIG. 7C. Otherwise, as shown in FIG. 7C, the presentation display is provided with a user-selectable "basic" button 728 which, upon selection, can result in a rendering of a "basic" mode screen display 700A shown in FIG. 7A.

In an embodiment, the application functions for reducing RF emissions exposure run as long as an active phone call is in progress. For example, the operations of the steps 515, 518 can be determined in less than 0.5 minutes, and if the user is still on the phone, the mobile phone orientation relative to the cell phone tower may change to an extent that the risk of RF emissions exposure becomes enhanced. Thus, continuing to FIG. 5, at 521, a determination is made as to whether the application internal timer has timed out. If the timer did not time out, then a quick check is made at step 525 to determine that the user's call is still active (i.e., the user is still on the phone) in which case the process returns to 515 in which the application repeats steps for retrieving the user's current cell location information used to determine the orientation of the cell phone (with or without RF shield) relative to the nearest cell phone tower and repeats steps at 518 for initiating the prompting at the cell phone to notify the user to change the orientation of the cell phone based on the current user's cell phone orientation.

However, at 521, if it is determined that the internal timer did time out and at 525 it is determined that the user's call is still active, the process proceeds to step 527 in order to re-set the internal timer before returning to repeat process steps 515, 518. Otherwise, at 521, if it is determined that the application's internal timer has not yet timed out, but at step 525 it is determined that user's current call has terminated and the user is no longer using the cell phone, then the application will turn off the internal timer at 529 and the process will return to step 506 to wait for the next activation of the cell phone call service/operations and repeat the method 500.

In further embodiments, the app is configurable to run even when the user is not actively speaking on a call, but rather is Internet browsing, or is chatting via Short Message Service (i.e., SMS texting) according to an SMS communications protocol. The application can also run when the phone is not being held by the user, i.e., when the phone is in the user's clothing/pocket or attached to the user, e.g., via a case holder, holster, or like attachable phone device casing, and is still communicating with the cell phone network base station. In such instances, the app could still be run to inform the user to modify the orientation of the phone in order to protect the user by reducing the user's RF signal exposure related to the active communications. Further, even without use of the RF shield, the use of the application to alert the user to modify the phone's orientation can effectively reduce battery power consumption and improve battery lifetime by helping the user to position the transmitting device (e.g. cell phone) in the optimum location to reduce signal attenuation by the human body.

In alternative embodiments, the method of FIG. 5 can be run at a network based service, e.g., as part of a cloud-based service. In such implementation, the method steps of further include steps for receiving over a communications network an upload from the cell phone of the relevant cell phone data including: the user cell phone's position, the cell phone's orientation or azimuth angle, and an identification of the particular cell within which the cell phone is communicating. Upon receipt of this information, the cloud-based service runs the method steps herein to determine the cell phone tower location from a public or private database, the current RF signal emissions strength, and/or compute the bearing angle of the cell phone tower location used to determine whether to modify the cell phone orientation according to the methods described herein and responsively download to the user's cell phone or associated system (e.g., the user's smart watch) a particular alert message(s) or signal whether to initiate changing of the user's cellphone orientation, or not.

Figure 8:
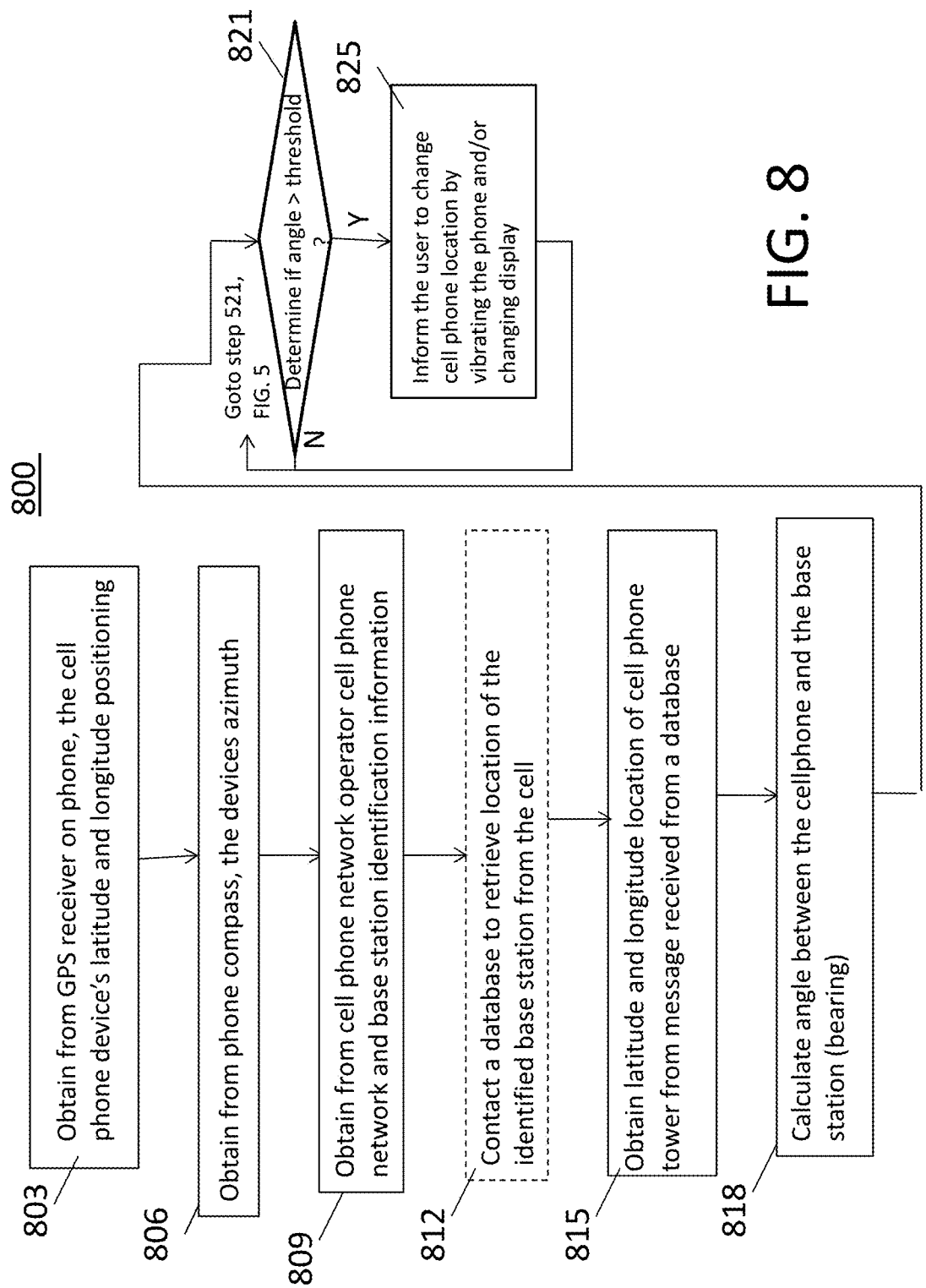
FIG. 8 depicts a method associated with a function used in a cell phone application for calculating cell phone orientation and the responsive action taken in one embodiment.

FIG. 8 depicts an embodiment of the method associated with functions used in the RF emission exposure reducing cell phone application for calculating cell phone orientation and the responsive actions taken. In particular the method 800 is an example implementation of the functions depicted at steps 515, 518 of FIG. 5 whether run on the cell phone device or run at a cloud-based network infrastructure.

A first step 803, whether run at the user's cell or at a cloud-based server, FIG. 8 represents the step of obtaining from the GPS receiver on the mobile phone, the cell phone device's latitude and longitude positioning. Then, at 806, the method runs to obtain from the mobile phone device compass application, the device's current orientation measured as an azimuth angle "α". As mentioned, azimuth angle α is the current compass bearing of the user/mobile phone antenna relative to a true geographic reference (e.g., earth's north or south pole). The horizon is defined as an imaginary circle centered on the caller, and the compass bearings are measured clockwise in degrees from north, e.g., ranging from 0 degrees (north) through 90 (east), 180 (south), 270 (west), and up to 360 (north again).

Continuing to 809, FIG. 8, the method initiates an internal function call to obtain from the cell phone network operator the identification of the cell phone tower base station. The specific implementation of this and other functions depends on the programming language used. For example, the MIT's App Inventor software is used to program the function, the "Taifun" telephony manager extension can be used with the call "Taifun TM1. Network Operator" to get the mobile phone processor to return information maintained at the phone including the cellular phone network operator identification information (e.g., ATT, Verizon, etc.). Further information is returned including information such as: Mobile Country Code (MCC) informing which country the mobile phone device is in, and Mobile Network Code (MNC) which is the number representing the cell phone network. This information is used to identify the closest cell phone tower and base station receiver with which the user's mobile phone device is communicating with.

Using a further telephony manager function call (e.g., "Taifun TM1. Lac"), the mobile phone processor returns to the mobile phone application the Location Area Code (LAC) of the cell within which the base station receiver is located. A further function call (e.g., "Taifun TM1. CellID") returns to the application the base station Cell Identification (CI). Given this unique cell information, the application runs a method to initiate sending of this unique cell information to a locator service via a locator service application program interface (API) to obtain the cell phone tower location latitude and longitude coordinates. For example, at 812, via the locator service API, the user's phone or cloud-based service initiates a communication with a public or private database to retrieve location of the identified base station from the cell ID.

In an embodiment, at 812, the application sends a message including the unique cell identification information (LAC, CI) to the locator service, e.g., at a location service provider such as Unwired Labs provided at www.unwiredlabs.com. The locator service provides an Application Programming Interface (API) enabling a user to obtain the location of the base station from the provided cell ID information. In response to receiving the cell ID information via the API, at 815, the locator service then obtains the location of the cell phone tower and converts that information to cell phone tower latitude and longitude position coordinates. The locator service API returns these latitude and longitude coordinate values to the reduce RF emissions application.

The process continues at 818, FIG. 8 where the application invokes a routine to calculate angle between the user cell phone and the base station—in particular the bearing angle β. In one embodiment, the bearing is found given the two different locations, i.e., the user cell phone location (1) and cell phone tower location (2) represented as respective points each having latitude, longitude coordinate values as obtained using the methods herein. The bearing (angle "β") from point 1 to 2 is then calculated in radians according to:

$$\beta = a\tan 2(X, Y)$$

where quantity $X$ is computed as: $X = \cos\theta_2 * \sin \Delta L$; and quantity $Y$ is computed as: $Y = \cos\theta_1 * \sin\theta_2 - \sin\theta_1 * \cos\theta_2 * \cos \Delta L$, and wherein $\theta_2$ is the obtained latitude value of the nearest cell phone tower location, $\theta_1$ is the obtained latitude value of the user's cell phone location and $\Delta L$ is the difference between the longitude value of the user's cell phone location and the longitude value of the nearest cell phone tower location. In an embodiment, the application can implement a routine for converting the bearing angle β from radians to degrees. Further, the angle β is specified relative to a North direction i.e., 0° bearing meaning North, 90° bearing being East, 180° bearing being South, and 270° to be West.

Continuing to 821, FIG. 8, a comparison is made as to whether an absolute value difference between the computed bearing angle β and obtained mobile device orientation azimuth angle α value is less than a threshold angle, e.g., 90° degrees. Such determination is computed according to:

$$|\beta - \alpha| < \text{threshold angle, which in this example is } 90°.$$

The threshold angle is configurable to ensure the correct cell phone positioning and can range anywhere between 0 degrees and 180 degrees, although this range can be expanded.

From the comparison performed by a software routine at 821, FIG. 8, if the difference between bearing and azimuth angles is determined as being greater than the threshold angle, then the process returns to step 521, FIG. 5 to repeat determining the respective current location values for cell phone and cell phone tower. Otherwise, if the difference between bearing and azimuth angles (bearing angle between the user cell phone location and cell phone tower) is less than the threshold angle, this is an indication that the user's risk of RF emissions exposure can be reduced by re-orienting the location of the mobile phone. Thus, in response, at 825, FIG. 8, the user's cell phone or associated communicating device such as the user's smart watch, runs a routine invoking cell phone operations to inform the user to change cell phone location by vibrating the phone, rendering an audible signal, and/or changing display color or other visual attribute of the user-interface display. Then the method returns to step 521, FIG. 5 to repeat the methods herein. As the application continuously runs the method as long as an active phone call is in progress, the user will be promptly notified as to whether the phone's orientation has been sufficiently changed to reduce the user's RF signal emissions exposure, for example, via the phone's screen interface, the next time the process repeats.

However, it is to be understood that in the aforementioned example whether the meaning of the absolute value difference between bearing and azimuth angles being greater than or less than the threshold angle is dependent upon whether the compass bearing in the cell phone is towards the north or south magnetic pole. For example, if the absolute value difference being less than the threshold value when the compass bearing in the cell phone points to the north pole signifies that the user should reorient the cell phone, then when the compass is bearing in the cell phone towards the south pole, the absolute value difference being greater than the threshold value signifies that the user should reorient the cell phone. In other words, the meaning of this absolute value difference relative to the threshold value in cell phones pointing to the north magnetic pole has the opposite meaning for cell phones pointing to the south magnetic pole. However, the program will take into account whether the compass bearing in the cell phone is towards the north or south magnetic pole and how the compass is oriented inside the cell phone and based on the absolute value difference, will communicate to the user whether the cell phone should be reoriented or not.

FIG. 9 depicts various re-orientations of a mobile cell phone device held by the user of FIG. 1, including the phone device's azimuth angle which is computed based on the orientation of the device's internal compass relative to the mobile device screen, and computed bearing angle of the device's RF signals relative to the cell phone tower. As shown in FIG. 9, a user is holding an actively communicating mobile device 20 in various orientations relative to a directional antenna 90 of a cellular network base station tower 80. In the various orientations depicted, the mobile device 20 can have the RF shield 900 installed to reduce the anisotropicity of the communicated RF signals received at and generated by the phone, although the RF shield does not have to be installed. In a first example orientation, user 10 is holding the phone at an orientation such that the device's internal compass orientation relative to the mobile device screen will generate an azimuth angle α1 of device 14 antenna relative to a reference "north" direction, and a bearing angle β1 between the user cell phone and the base station as determined by the obtained GPS data of the network cell tower and user mobile device. In a second orientation, user 10 is holding the phone at an orientation such that the device's internal compass orientation relative to the mobile device screen will generate an azimuth angle α2 and a bearing angle β2 between the user cell phone and the base station. In a third example orientation, the user 10 is holding the phone at an orientation that corresponds to an azimuth angle α3 and a bearing angle β1 between the user cell phone and the base station. In a fourth example orientation, the user 10 is holding the phone at an orientation that corresponds to an azimuth angle α4 and a bearing angle β4 between the user cell phone and the base station. In each orientation, the radiated RF signal energy 30 of the mobile device communications is depicted.

In view of FIG. 9, and in a further embodiment, the application, whether run at the user's mobile device or run as a service application at a remote network location, is configured to determine when the absolute value of β minus α is smaller than 90 degrees (for example). When such a determination is made, the app will communicate to the device to alert and inform the user to change the position of the cell phone relative to the cell tower and/or the reference "north" direction in order to reduce signal attenuation of the signals 30 when the user 10 is between the cell phone 20 and the cell tower antenna 90. This formula, threshold value and direction of the inequality may change depending on the actual definition of α and β due to the specific hardware configuration inside the cell phone (i.e. in some cell phones, the compass may be pointing away from the user, with in others, the compass is pointing towards the user).

That is, different cell phones may have the internal compass oriented along different directions. For example, in some devices, the internal compass may be situated in a cell phone parallel to the screen. In others, the compass may be perpendicular to the screen. In addition, in the latter case, the compass may measure degrees with respect to magnetic north, e.g., the compass indicates 0 degrees when the cell phone screen is pointing towards the magnetic north, while in some other devices, 0 degrees is indicated when the back of the screen points towards the magnetic north. FIG. 9 depicts the case of a device that 0 degrees from the internal compass mean that the screen in pointing towards the magnetic north, while the back of the cell phone points towards the South. In that case, the threshold angle will be 90 degrees. When abs(beta−alpha)<threshold angle (e.g., 70°, 80° or 90°), the warning alert is generated to inform the user to change the orientation of the cell phone. It is understood that the inequality of the measurement abs(beta-alpha) can be > or < depending upon whether measurements are made relative to the magnetic north or south pole, and how the compass is oriented inside the cell phone.

In embodiments, a further RF signal profile monitoring function can be provided at the phone as the user changes the location or orientation of the mobile cell phone in response to receiving the alert signal to change the cell phone location. In an example implementation of notifying the user by providing signals changing display color or other visual attribute of the user-interface display, a monitoring function can detect continuous changes in signal emissions as the user changes the location of angular orientation of the cell phone. In this embodiment, based on the emissions changes detected in response to the measured quantity, β minus α representing cell phone location/angular changes, a corresponding alert signal is generated that changes accordingly. For example, the generated signal is a continuous or "analog" signal that tell the user how far the current orientation is from the optimum one. Responsive to this generated signal, the screen could gradually change color, e.g., indicate a more intense red color indicating a worse orientation or a more intense green color indicating a better orientation. Alternately, responsive to this signal, the phone may generate for display a number indication, e.g., a number from 0 to 100, to indicate how far from the optimum orientation the phone is. Thus, when monitoring an orientation of the phone when being modified by the user, further alert signals can be transmitted and or presented for display to indicate whether the changed orientation is reducing the user's exposure and/or improving the phones battery lifetime. For example, an indication based on the orientation can be provided as one of: a first signal characteristic (e.g., increasing intensity of red color in the display) indicating to the user an improper orientation for reducing cell phone power consumption, a second signal characteristic (e.g., increasing intensity of green color in the display) indicating to the user the best orientation for reducing threshold, and a third signal characteristic (e.g., a red color display or green color display of reduced intensity or color shade in the display) indicating to the user that the mobile phone orientation can be improved for reducing mobile phone power consumption. The signal could be changed abruptly based on the value $|\beta-\alpha|$ passing a threshold, or continuously to directly track $|\beta-\alpha|$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a solid state disk (SSD), a Secure Digital (SD) memory card, a micro Secure Digital (micro SD) memory card, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Swift, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a mobile phone device, a general purpose computer, special purpose computer, a laptop computer, a tablet, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Instead of the user being a human being, the present disclosure contemplates that the method described herein be programmed into a mobile device so that the mobile device can automatically advise the mobile device user to orient the mobile device to a position that reduces the RF radiation. Such an application is contemplated by the present disclosure.

As indicated hereinabove, although the present disclosure illustrates the various embodiments with a cell phone, it is applicable to other mobile devices, as defined herein.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, at a processor device of a computer system, data communicated from a mobile device held by a user, the data representing a current location of the mobile device, a current mobile device orientation angle relative to a reference axis, and data representing an identification of a communications cell in which a communications receiver is located for receiving signals communicated by the mobile device;
   obtaining, by the computer system processor device, data representing a location of the communications receiver;
   computing, by the computer system processor device, an angle based on the data representing the current location of the mobile device, the data representing current orientation angle of the mobile device and data representing the location of the communications receiver;
   comparing, by the computer system processor device, the computed angle against a pre-determined threshold angle; and
   in response to the comparison, either generating, for receipt by the user, a warning indication for the user to modify an orientation of the mobile device with respect to the user, wherein the mobile device power used to communicate signals with the communications receiver is decreased when said mobile device orientation is modified resulting in increased mobile device battery lifetime, or not generating a warning indication, wherein the user does not modify the orientation of the mobile device, wherein said generating, for receipt by the user, a warning indication comprises: said computer system processor device initiating a communication of a warning signal for receipt at the user's mobile device, a device associated with the user, or both the user's mobile device and the device associated with the user, the warning signal indicating that the current orientation of the mobile device relative to the user be modified, and wherein the device associated with the user comprises one or more of: a smart watch worn by the user, a virtual reality goggles worn by the user, or headphones or earphones worn by the user or mobile cell phone.

2. The method of claim 1, wherein said mobile device includes an RF shield placed on the mobile device between an antenna on the mobile device and the user of the mobile device for rendering emissions of communicated RF signals more anisotropic.

3. The method of claim 2, wherein said included RF shield placed on the mobile device between an antenna of the mobile device and the user of the mobile device attenuates the RF signal emissions radiated towards the user by the mobile device.

4. The method of claim 2, wherein said included RF shield results in increased RF signal power emissions transmitted in a direction opposite to the RF shield and towards the communications receiver.

5. The method of claim 1, wherein the warning signal at the user's mobile device or the device associated with the user informs the mobile device user to change which hand the actively communicating mobile device is being held by the user or change the user's orientation.

6. The method of claim 1, wherein the user's mobile device or the device associated with the user is responsive to the warning signal to present the warning indication as a message displayed via a device screen display interface, as an audio warning signal, as a visual warning signal, or as a vibration of the user's mobile device or the device associated with the user.

7. The method as claimed in claim 1, further comprising: monitoring an orientation of said mobile device when modified by said user and, providing an indication based on the orientation, wherein a transmitted signal indication is a signal comprising one of: a first signal characteristic indicating to the user an improper orientation for reducing mobile device power consumption, a second signal characteristic indicating to the user the best orientation for reducing the RF signal emissions radiated towards the user, or a third signal characteristic indicating to the user an improved mobile device orientation for reducing mobile device power consumption.

8. The method of claim 1, wherein the data representing a current location of the actively communicating mobile device held by a user comprises a first geographic latitude value and first longitude value, and the data representing current orientation angle of the mobile device is an azimuth angle of the current mobile device orientation, said method further comprising:
obtaining, by the computer system processor, from a database, the data representing the location of the communications receiver, said data representing the location of the communications receiver comprising a second geographic latitude value and second longitude value; and
computing, by the computer system processor, using the first geographic latitude value and first longitude value and the second geographic latitude value and second longitude value, a bearing angle between the current location of the mobile device and the location of the communications receiver, wherein the computed angle to be compared represents a difference between the computed bearing angle and the current orientation angle of the mobile device.

9. The method of claim 8, further comprising:
repeating, at said computer system processor:
said obtaining data representing a current location of said mobile device;
said obtaining data representing a current orientation angle of the mobile device;
said obtaining an identification of a communications cell;
said obtaining data representing a location of the communications receiver based on the communications cell identification;
said computing of the angle value based on the data representing the current location, the data representing current orientation angle and data representing the location of the communications receiver; and
said comparing the computed angle value against a pre-determined threshold angle; and
in response to the comparison, either generating, for receipt by the user, a warning indication, indicating that the user modify orientation of mobile device being held by the user, or not generating a warning indication, indicating that the user not modify orientation of the mobile device.

10. The method according to claim 1 wherein the mobile device is a cell phone.

11. The method according to claim 10, wherein in response to the comparison,
generating a signal used to re-configure the mobile device to connect to a different communications cell in which another communications receiver is located for communicating signals with the mobile device.

12. The method according to claim 10, wherein in response to the comparison, generating a signal used to re-configure the mobile device to modify a radiation pattern of the signals communicated with the communications receiver.

13. A method comprising:
obtaining, from a processor running at a mobile device, data representing a current location of the mobile device held by a user, the mobile device actively communicating signals with a communications receiver over a communications channel;
obtaining, from the mobile device processor, data representing a current orientation angle of the mobile device relative to a reference axis;
obtaining, using the mobile device processor, an identification of a communications cell in which the communications receiver is located;
obtaining, using the mobile device processor, data representing a location of the communications receiver;
computing, using the mobile device processor, an angle based on the data representing the current location, the data representing current orientation angle of the mobile device and data representing the location of the communications receiver;
comparing, using the mobile device processor, the computed angle against a pre-determined threshold angle; and
in response to the comparison, either generating, using the mobile device processor, a warning indication for receipt at a mobile device interface of the mobile device, a device associated with the user, or both at the mobile device interface and the device associated with the user, for the user to modify orientation of the mobile device, wherein the mobile device power usage is decreased when said mobile phone orientation is modified resulting in increased mobile device battery lifetime, or not generating a warning indication, indicating that the user not modify the orientation of the mobile device, and wherein the device associated with the user comprises one or more of: a smart watch worn by the user, a virtual reality goggles worn by the user, or headphones or earphones worn by the user or mobile cell phone.

14. The method of claim 13, wherein said mobile device includes an RF shield placed on the mobile device between a mobile device antenna and the mobile device user for rendering emissions of communicated RF signals more anisotropic.

15. The method of claim 14, wherein said included RF shield placed on the mobile device between a mobile device antenna and the mobile device user attenuates the RF signal emissions radiated and towards the user by the mobile device.

16. The method of claim 14, wherein said included RF shield placed on the mobile device results in increased RF signal power emissions transmitted in a direction opposite to the RF shield towards the communications receiver.

17. The method of claim 13, wherein the generated warning at the device interface informs the mobile device user to change which hand the actively communicating mobile device is being held by the user or change the user's orientation.

18. The method of claim 17, wherein the mobile device processor is further configured to present the warning indication at the mobile device interface, at the device associated with the user, or both the user's mobile device interface and the device associated with the user as a message displayed via a device screen display interface, as an audio warning signal, as a visual warning signal, or as a vibration of the mobile device to provide the warning to the user.

19. The method as claimed in claim 17, further comprising: monitoring, by the mobile device processor, an orientation of said phone when modified by said user and, providing an indication at the mobile device based on the orientation, wherein the indication is a signal having one of: a first signal characteristic indicating to the user an improper orientation for reducing power consumption of the mobile device, a second signal characteristic indicating to the user the best orientation for reducing the RF signal emissions radiated towards the user, or a third signal characteristic indicating to the user an improved mobile device orientation for reducing mobile device power consumption.

20. The method of claim 17, wherein the data representing a current location of the actively communicating mobile device held by a user comprises a first geographic latitude value and first longitude value, and the data representing current orientation angle of the mobile device is an azimuth angle of the current mobile device orientation, said method further comprising:
 obtaining, by the mobile device processor, from a database, the data representing the location of the communications receiver, said data representing the location of the communications receiver comprising a second geographic latitude value and second longitude value; and
 computing, using the first geographic latitude value and first longitude value and the second geographic latitude value and second longitude value, a bearing angle between the current location of the mobile device and the location of the communications receiver, wherein the computed angle to be compared represents a difference between the computed bearing angle and the current orientation angle of the mobile device.

21. The method of claim 20, further comprising:
repeating, by the mobile device processor:
said obtaining data representing a current location of said mobile device;
said obtaining data representing a current orientation angle of the mobile device;
said obtaining an identification of a communications cell;
said obtaining data representing a location of the communications receiver based on the communications cell identification;
said computing of the angle value based on the data representing the current location, the data representing current orientation angle and data representing the location of the communications receiver;
said comparing the computed angle value against a pre-determined threshold angle; and
in response to said comparison, either generating a warning indication at the mobile device interface, indicating that the user modify orientation of mobile device being held by the user, or not generating a warning indication, indicating that the user not modify orientation of the mobile device.

22. A computer program product comprising a non-transitory computer readable storage medium having program instructions embodied therewith, the program instructions executable by a hardware processor to cause the processor to perform a method comprising:
 obtaining data representing a current location of a mobile device, the mobile device actively communicating signals with a communications receiver over a communications channel;
 obtaining data representing a current orientation angle of the mobile device relative to a reference axis;
 obtaining an identification of a communications cell in which the communications receiver is located;
 obtaining data representing a location of the communications receiver;
 computing an angle based on the data representing the current location, the data representing current orientation angle of the mobile device and data representing the location of the communications receiver;
 comparing the computed angle against a pre-determined threshold angle; and
 in response to the comparison, either generating a warning indication, for receipt by a user, to change the orientation of the mobile device with respect to the user to reduce RF signal emissions exposure of the user holding the mobile device, wherein the mobile device power used to communicate with the communications receiver is decreased when said mobile device orientation is modified, resulting in increased mobile device battery lifetime, or not generating a warning indication, indicating that the user not modify the orientation of the mobile device, wherein said generating a warning indication, for receipt by the user, comprises: initiating a communication of a warning signal for receipt at the user's mobile device, a device associated with the user, or both the user's mobile device and the device associated with the user, the warning signal indicating that the current orientation of the mobile device relative to the user be modified, and wherein the device associated with the user comprises one or more of: a smart watch worn by the user, a virtual reality goggles worn by the user, or headphones or earphones worn by the user or mobile cell phone.

23. The computer program product of claim 22, wherein the warning signal at the user's mobile device or the device associated with the user informing the mobile device user to change which hand the actively communicating mobile device is being held by the user, or change the user's orientation,
 said user's mobile device or device associated with the user being responsive to said warning signal to present the warning indication as a message displayed via a device screen display interface, as an audio warning signal, as a visual warning signal, or as a vibration of the user's mobile device or the device associated with the user.

24. The computer program product as claimed in claim 23, wherein said programmed instructions further configures the hardware processor to: monitor an orientation of said mobile device when modified by said user and, provide an indication based on the orientation, wherein a transmitted signal indication is a signal comprising one of: a first signal characteristic indicating to the user an improper orientation for reducing mobile device power consumption, a second signal characteristic indicating to the user the best orientation for reducing the RF signal emissions radiated towards the user, or a third signal characteristic indicating to the user an improved mobile device orientation for reducing mobile device power consumption.

25. The computer program product of claim 23, wherein the data representing a current location of the actively communicating mobile device held by a user comprises a first geographic latitude value and first longitude value, and the data representing current orientation angle of the mobile device is an azimuth angle of the current mobile device orientation, said programmed instructions further configures the hardware processor to:
 obtain from a database, the data representing the location of the communications receiver, said data representing the location of the communications receiver comprising a second geographic latitude value and second longitude value; and
 compute, using the first geographic latitude value and first longitude value and the second geographic latitude value and second longitude value, a bearing angle between the current location of the mobile device and the location of the communications receiver, wherein the computed angle to be compared represents a difference between the computed bearing angle and the current orientation angle of the mobile device.

26. The computer program product of claim 23, wherein said programmed instructions further configures the hardware processor to:
repeat:
said obtaining data representing a current location of said mobile device;
said obtaining data representing a current orientation angle of the mobile device;
said obtaining an identification of a communications cell;
said obtaining data representing a location of the communications receiver based on the communications cell identification;
said computing of the angle value based on the data representing the current location, the data representing current orientation angle and data representing the location of the communications receiver; and
said comparing the computed angle value against a pre-determined threshold angle; and
in response to said comparison, either generating, for receipt by the user, a warning indication, indicating that the user modify orientation of mobile device being held by the user, or not generating a warning indication, indicating that the user not modify orientation of the mobile device.

27. The non-transitory computer program of claim 22 wherein the mobile device is a cell phone.

28. A mobile device comprising:
a memory storage element for storing data;
a processor at the mobile device coupled with the memory storage element, the processor receiving instructions from the memory storage element to configure the processor to:
obtain data representing a current location of the mobile device when the mobile device is actively communicating signals with a communications receiver over a communications channel;
obtain data representing a current orientation angle of the mobile device relative to a reference axis;
obtain an identification of a communications cell in which the communications receiver is located;
obtain data representing a location of the communications receiver;
compute an angle based on the data representing the current location, the data representing current orientation angle of the mobile device and data representing the location of the communications receiver;
compare the computed angle against a pre-determined threshold angle; and
in response to the comparison,
either generate a warning indication for receipt at a mobile device interface of the mobile device, a device associated with the user, or both at the mobile device interface and the device associated with the user, for the user to modify orientation of the mobile device, wherein the mobile device power usage is decreased when said mobile device orientation is modified resulting in increased mobile device battery lifetime, or not generate a warning indication, indicating that the user not modify the orientation of the mobile device, and wherein the device associated with the user comprises one or more of: a smart watch worn by the user, a virtual reality goggles worn by the user, or headphones or earphones worn by the user or mobile cell phone.

29. The mobile device of claim 28, further comprising: an RF shield placed on the mobile device between a mobile device antenna and the mobile device user for rendering emissions of communicated RF signals more anisotropic.

30. The mobile device of claim 29, wherein said included RF shield placed on the mobile device between a mobile device antenna and the mobile device user is configured to attenuate the RF signal emissions radiated towards the user by the mobile device.

31. The mobile device of claim 29, wherein said included RF shield placed on the mobile device is configured to increase RF signal power emissions transmitted in a direction opposite to the RF shield and towards the communications receiver.

32. The mobile device of claim 28, wherein the generated warning indication at mobile device interface is configured to indicate to the mobile device user for a change in the orientation of the mobile device.

33. The mobile device of claim 32, wherein the mobile device processor is further configured to present the warning indication at the mobile device interface, at the device associated with the user, or both at the mobile device interface and the device associated with the user as a message displayed via a device screen display interface, as an audio warning signal, as a visual warning signal, or as a vibration of the mobile device or the device associated with the user.

34. The mobile device of claim 32, wherein the mobile device processor is further configured to:
monitor an orientation of said mobile device when modified by said user and, provide an indication at the mobile device based on the orientation, wherein the indication is a signal having one of: a first signal characteristic indicating to the user an improper orientation for reducing mobile device power consumption, a second signal characteristic indicating to the user the best orientation for reducing the RF signal emissions radiated towards the user, or a third signal characteristic indicating to the user an improved mobile device orientation for reducing mobile device power consumption.

35. The mobile device of claim 32, wherein the data representing a current location of the actively communicating mobile device held by a user comprises a first geographic latitude value and first longitude value, and the data representing current orientation angle of the mobile device is an azimuth angle of the current mobile device orientation, said mobile device processor further configured to:
obtain from a database, the data representing the location of the communications receiver, said data representing the location of the communications receiver comprising a second geographic latitude value and second longitude value; and
compute, using the first geographic latitude value and first longitude value and the second geographic latitude value and second longitude value, a bearing angle between the current location of the mobile device and the location of the communications receiver, wherein the computed angle to be compared represents a difference between the computed bearing angle and the current orientation angle of the mobile device.

36. The mobile device of claim 35, wherein said mobile device processor further configured to:
repeat:
said obtaining data representing a current location of said mobile device;

said obtaining data representing a current orientation angle of the mobile device;

said obtaining an identification of a communications cell;

said obtaining data representing a location of the communications receiver;

said computing of the angle value based on the data representing the current location, the data representing current orientation angle and data representing the location of the communications receiver;

said comparing the computed angle value against a predetermined threshold angle; and said comparing either generating a warning indication at the mobile device interface, indicating that the user modify orientation of mobile device being held by the user, or not generating a warning indication, indicating that the user not modify orientation of the mobile device.

37. The mobile device of claim 28 which is a cell phone.

* * * * *